Figure 1:
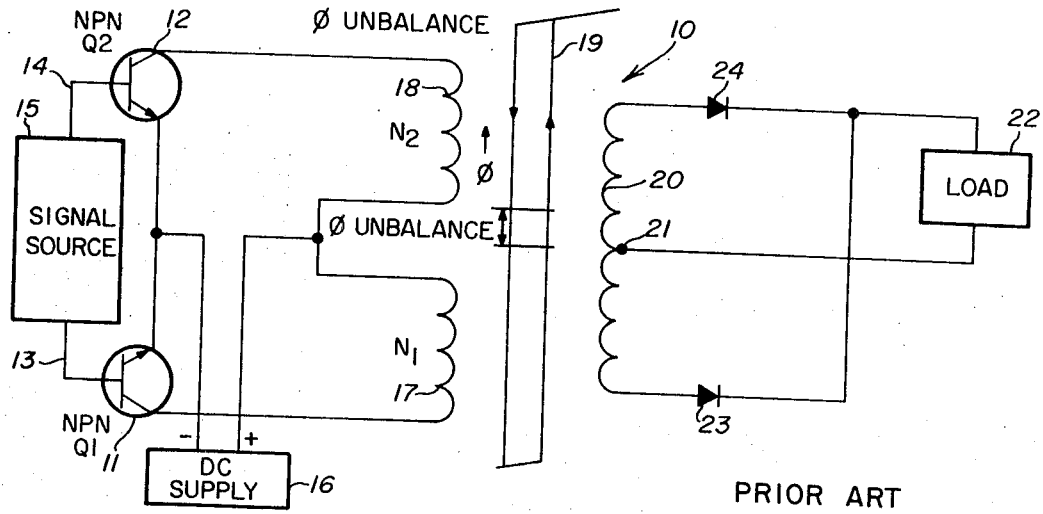

United States Patent

Gregorich

[15] 3,659,185

[45] Apr. 25, 1972

[54] VOLT-SECOND UNBALANCED COMPENSATED TWO CORE POWER TRANSFORMER

[72] Inventor: James M. Gregorich, Marlboro, Mass.

[73] Assignee: Collins Radio Company, Cedar Rapids, Iowa

[22] Filed: June 10, 1971

[21] Appl. No.: 151,666

[52] U.S. Cl. .................................. 321/2, 321/11, 321/25, 321/45 R, 331/113 A
[51] Int. Cl. ........................................................ H02m 3/14
[58] Field of Search .................. 321/2, 11, 25, 45 R; 331/113 A; 323/56

[56] References Cited

UNITED STATES PATENTS

| | | |
|---|---|---|
| 3,223,945 | 12/1965 | Damon .............................. 331/113 A |
| 3,275,948 | 9/1966 | Rosenbusch ....................... 331/113 A |
| 3,473,104 | 10/1969 | Tate ..................................... 321/45 R |
| 3,492,562 | 1/1970 | Genuit ................................. 321/2 X |
| 3,526,823 | 9/1970 | Genuit ................................. 321/2 |
| 3,541,428 | 11/1970 | Schwarz ............................... 321/2 |

Primary Examiner—William H. Beha, Jr.
Attorney—Warren H. Kintzinger and R. J. Crawford

[57] ABSTRACT

A two-core dc to dc converter power transformer having duo reset coils circuit interconnected for compensating volt-second unbalance. The circuit interconnect between the reset coils on both cores includes current limiting means limiting current flow after core reset to saturation and diode signal rectifying means.

8 Claims, 4 Drawing Figures

Patented April 25, 1972

3,659,185

3 Sheets-Sheet 1

INVENTOR
JAMES M. GREGORICH

BY *Warren H. Kinzinger*
ATTORNEY

Patented April 25, 1972

3,659,185

3 Sheets-Sheet 2

INVENTOR
JAMES M. GREGORICH
BY Warren H. Kurtzinger
ATTORNEY

INVENTOR
JAMES M. GREGORICH

VOLT-SECOND UNBALANCED COMPENSATED TWO CORE POWER TRANSFORMER

This invention relates in general to dc to dc converter power transformers and, in particular, to a two-core dc to dc converter power transformer capable of operation with substantially any practically occurring amount of volt-second unbalance applied to the primary coils being compensated for without saturation of the cores.

Conventional one-core dc to dc converter power transformers are driven into saturation at one end of their B-H loops when they are operated with an unsymmetrical volt-second source. This is particularly noticeable and objectionable in low-voltage transistor inverters where a balanced drive is virtually impossible to obtain since the semiconductor voltage drops are a significant portion of the total voltage drop across the transformer.

The reason for such one end saturation, particularly with conventional one-core power transformers, may be understood by considering that when one of two driving transistors is on the flux level in the core is increased by an amount equal to $$\frac{1}{N_1}\int_0^{t_1} E_1 dt$$

and when the other transistor is on the flux in the core is reduced by $$-\int_{t_1}^{t_2} \frac{E_2}{N_2} dt$$

If these quantities are not equal, with $N_1$ and $N_2$ being two primary transformer coil winding sections individually alternatively driven by the two driving transistors, there will be a net positive or negative increase in flux subject to accumulation with each succeeding cycle until the core saturates at plus or minus $\phi$ maximum. Operation then stabilizes around this point with the core being driven into saturation to make up the flux unbalance.

It is, therefore, a principal object of this invention to provide a two-core dc to dc converter power transformer capable of operation with any practically occurring amount of volt-second unbalance applied to the primaries without saturating the cores.

Another object with such a two-core dc to dc converter power transformer is to achieve desired operation without saturating the cores with dc source voltage applied directly across the primary windings.

Features of the invention useful in accomplishing the above objects include, in a volt-second unbalance compensated two-core dc to dc converter power transformer, two cores alternately on and off with the "off" core being reset to saturation by a winding on the "on" core and a current limiter (a resistor in one embodiment) limiting the saturation current. Thus, one core operates from a $-\phi$ maximum to some greater flux level and the other core operates from $+\phi$ maximum to some lesser flux level. Through proper choice of reset windings and respective reset voltages, the transformer is made to operate with any practically occurring mount of volt-second unbalance applied to the primaries without saturating the cores and with dc source voltage applied directly across both primary windings.

A specific embodiment representing what is presently regarded as the best mode of carrying out the invention is illustrated in the accompanying drawings.

Figure 2:
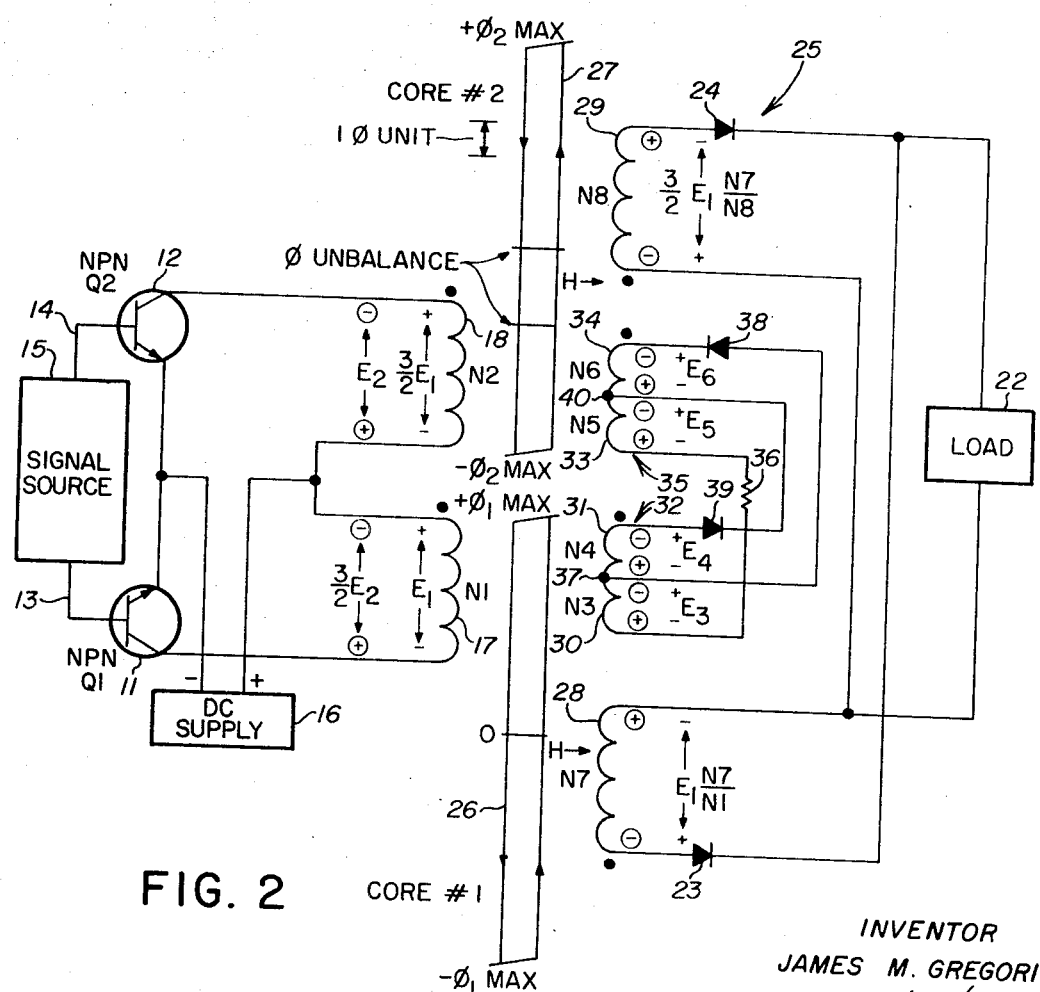
Figure 3:
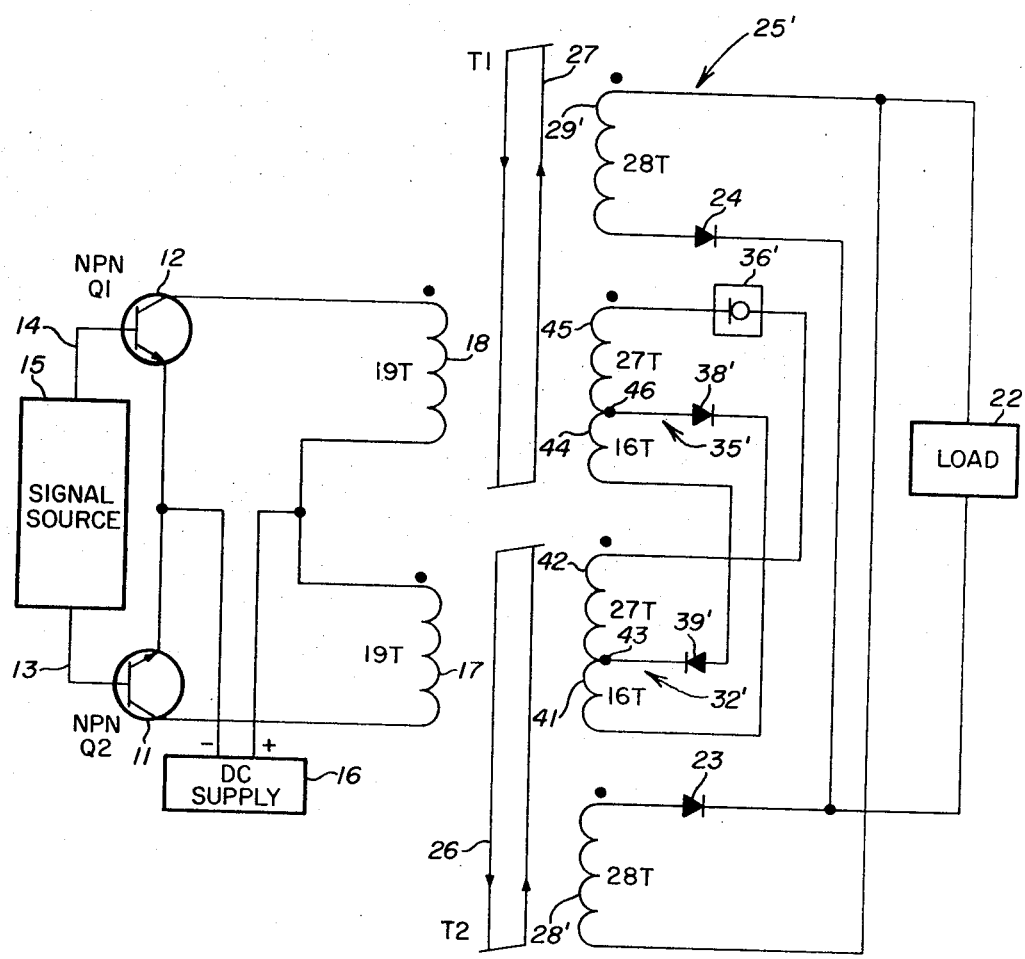
Figure 4:
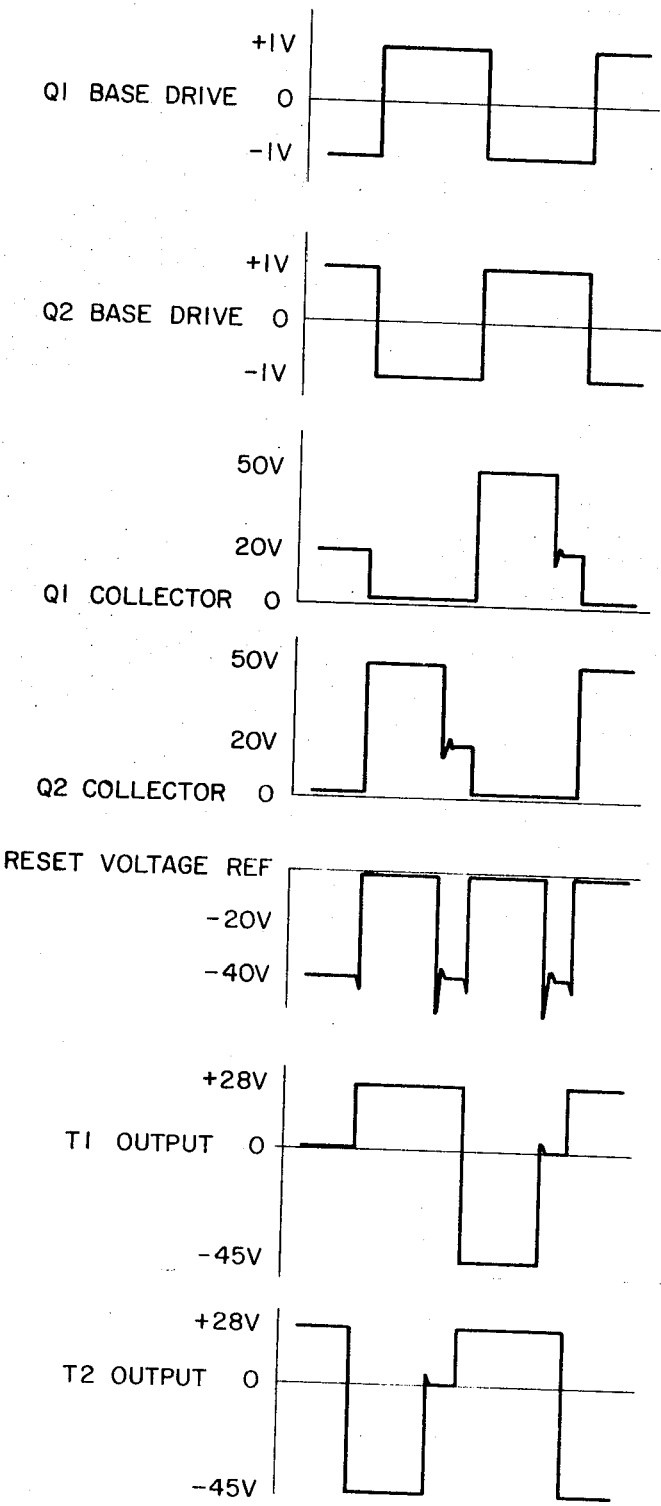

In the drawings:

FIG. 1 represents a schematic of a conventional prior art one-core dc to dc converter power transformer;

FIG. 2, a schematic of applicant's two-core dc to dc converter power transformer with "off" core reset windings for both cores;

FIG. 3, another schematic of a two-core dc to dc converter power transformer with some "off" core reset winding circuit changes from the embodiment of FIG. 2; and FIG. 4, a family of voltage waveforms at various locations in the two-core dc to dc converter power transformer of FIG. 3.

Referring to the drawings:

The prior art one-core dc to dc converter power transformer 10, of FIG. 1, has $Q_1$ and $Q_2$ NPN transformers 11 and 12 base fed by individual reverse square wave signal leads 13 and 14 from a suitable signal source 15. A dc power supply 16 has a negative terminal connected in common to the emitters of both NPN transistors 11 and 12, and a relatively positive terminal connected to a common junction of $N_1$ and $N_2$ transformer primary coils 17 and 18 having other ends connected to the collectors of NPN transistors 11 and 12, respectively. Transformer primary coils 17 and 18 are actually wound on a single transformer core 19, symbolized by a hysteresis curve of a ferrous metal compounded core, having a two-section secondary coil 20 wound thereon. Tap 21, that may be a center tap, of secondary coil 20 is connected to one side of load 22 and the opposite ends of secondary coil 20 are connected individually to the anodes of diodes 23 and 24 the cathodes of which are connected in common to the other side of load 22.

This prior art dc to dc converter transformer 10 is subject to being driven into saturation at one end of its B-H loop when it is operated with an unsymmetrical volt-second source. It is particularly noticeable, and objectionable, in low-voltage transistor inverters where a balanced drive is virtually impossible to obtain since the semiconductor voltage drops are a significant part of the total voltage dropped across the transformer primary coils. With continued reference to FIG. 1 when transistor $Q_1$ is on, the flux level in the core 19 is increased by an amount equal to $$\frac{1}{N_1}\int_0^{t_1} E_1 dt$$

and when $Q_2$ is on the flux in the core is reduced by $$-\int_{t_1}^{t_2} E_2 dt$$

If these quantities are not equal, there will be a net positive or negative increase in flux, that will accumulate with each succeeding cycle until the core saturates at plus or minus $\phi$ maximum. Operation then stabilizes around this point with the core being driven into saturation to make up the flux unbalance. Consider the following with respect to the prior art one-core dc to dc converter power transformer of FIG. 1.

$$L(di/dt) = N(d\phi/dt)$$
$$di = (N/L) d\phi$$
$$di = (N \, di/E \, dt) d\phi$$
$$di = \frac{dH \, d\phi}{N dt \frac{d\phi}{dt}}$$
$$di = dH \, d\phi$$
$$di = N \, Ac \, dB$$
$$di = \frac{dH}{dB N^2 Ac} E dt$$
$$di = \frac{1}{\mu_{Sat} N^2 Ac} E dt$$

with $\mu_{Sat} = \mu$ above Br
$E \, dt$ = volt second unbalance
$i$ = current due to volt-second unbalance One end saturation with such a one-core prior art power transformer causes high current spikes at the end of each cycle and acoustic noise if special care is not observed in building the transformer.

Many of the problems and difficulties with the prior art one-core dc to dc converter power transformer 10 of FIG. 1 are quite adequately resolved with applicant's two-core dc to dc converter power transformers such as the two-core embodiment of FIG. 2 with "off" core reset windings for both cores. With this dc to dc converter power transformer 25, the input section with $Q_1$ and $Q_2$ NPN transistors 11 and 12 as fed by signal source 15 and including dc power supply 16 and the $N_1$ and $N_2$ transformer primary coils 17 and 18 is substantially the same as with the prior art power transformer of FIG. 1. However, the transformer primary coils 17 and 18 are individually wound on the No. 1 and No. 2 cores 26 and 27 respectively. The No. 1 and No. 2 magnetic cores 26 and 27 are so spaced that there is substantially no material magnetic circuit linkage therebetween and these cores are equipped, respectively, with $N_7$ and $N_8$ secondary coils 28 and 29 with common polarization as indicated by the dots. Further, the most closely adjacent ends of the secondary coils 28 and 29 are connected in common to one side of load 22 just as the tap connection 21 of coil 20 in the embodiment of FIG. 1 is connected to the load 22 in that embodiment. The other ends of coils 28 and 29 are respectively connected to the anodes of diodes 23 and 24 with the cathodes connected therefrom in common to the other side of load 22. Still further, the No. 1 core 26 is equipped with an $N_3$ and $N_4$ two-section 30 and 31 coil reset winding 32 and the No. 2 core 27 is equipped with an $N_5$ and $N_6$ two-section 33 and 34 coil reset winding 35 with the bottom end of coil section 30 connected through current limiting resistor 36 to the bottom end of coil 35. Tap 37 between the $N_3$ and $N_4$ coil sections 30 and 31 is connected to the anode of diode 38 with a cathode connection to the upper end of the $N_6$ coil section 34. The upper end of the $N_4$ coil section 31 is connected to the anode of diode 39 having a cathode connection to tap 40 between the $N_5$ and $N_6$ coil sections 33 and 34 of the reset coil 35 for the No. 2 core 27.

Through use of two cores 26 and 27 in a dc to dc converter transformer such as the power transformer 25 of FIG 2, the "off" core may be reset to saturation by a winding on the "on" core with the resistor 36 limiting the saturation current. Thus, one of the cores 26 and 27 operates from a minus $\phi$ maximum to some greater flux level and the other core operates from a positive $\phi$ maximum to some lesser flux level. Through appropriate choice of reset windings $N_5$ coil section 33 and $N_3$ coil section 30 and the reset voltages $E_5$ and $E_3$, across the respective reset coil sections, the transformer can be made to operate with any practically occurring amount of volt-second unbalance applied to the primary coil windings 17 and 18 without saturating the cores 26 and 27 with the dc supply 16 source voltage applied directly across the primary coil windings 17 and 18. With the embodiment of FIG. 2 assuming that the turns $N_1$ or primary coil 17 equal $N_2$ the number of turns of primary coil 18 and that with the reset coils 32 and 35 that $N_3$ equals $N_4$ equals $N_5$ equals $N_6$, and further that $N_1$ equals $2 N_3$. Further, with No. 1 core 26 substantially equal to the No. 2 core 27, and operation started with, for example, $Q_1$ coming on and both cores previously at zero flux, since $E_1$ is a square wave voltage of T seconds, the flux added to the No. 1 core 26 is:

$$\phi_1 = \frac{E_1 t}{N_1}$$

During this time, the flux added to core No. 2 through winding $N_5$ is:

$$\phi_{2_{reset}} = \frac{E_5 t}{N_5} = \frac{(E_3 + E_4 - Iin_5 R_s) t}{N_5}$$

$Iin$ = Magnetizing current

Let
$$Iin_5 R_s = 1/4 (E_3 + E_4)$$
then,
$$\phi_{2_{reset}} = 3/4 \frac{(E_3 + E_4) t}{N_5}$$

$$E_3 = \frac{N_3 E_1}{N_1} = \frac{N_4 E_1}{N_1} = E_4$$

$$E_3 = \frac{E_1}{2} = \frac{E_1}{2} = E_4$$

or
$$\phi_{2_{reset}} = 3/4 \frac{\left(\frac{E_1}{2} + \frac{E_1}{2}\right) t}{N_5} \quad N_1 = 2 N_5$$

$$= 3/4 \frac{E_1 t}{N_5} = 3/2 \frac{E_1 t}{2 N_5} = 3/2 \frac{E_1 t}{N_1}$$

$$\phi_{2_{reset}} = 3/2 \phi_1$$

If enough volt-seconds are added to the $N_1$ core 17 to equal a flux level of six units, then the number 2 core 27 would saturate when the flux level of the $N_1$ core 17 reached four units. The resistor 36 is provided and of such value as to prevent excessive current when either of the cores 26 and 27 saturates. When the $Q_2$ NPN transistor 12 turns on voltages of the circled polaries are developed and the flux in the No. 2 core 27 is given by $$\phi_2 = -\frac{E_2 t_2}{N_2}$$

Let
$$E_2 t = E_1 t_1 + Et \text{ unbalance}$$

$$\phi_2 = -\frac{E_1 t_1}{N_1} - \frac{Et}{N_2} = -(\phi_1 + \phi \text{ unbalance})$$

Let $\phi$ unbalance = two units, and then while $Q_2$ is "on" the No. 1 core 26 is reset by the $N_3$ winding 30 and the reset flux is:

$$\phi_{1_{reset}} = \frac{E_3 t_2}{N_3}$$

$$E_3 = (E_5 + E_6) - Iin_3 R_5 = (E_5 + E_6) - 1/4(E_5 + E_6)$$

$$\phi_{1_{reset}} = 3/4 \frac{(E_5 + E_6) t_2}{N_3}$$

$$E_5 = \frac{N_5 E_2}{N_2} = \frac{N_6 E_2}{N_2} = E_6 \quad N_2 = 2 N_5 = 2 N_6$$

$$E_5 = \frac{E_2}{2} = E_6$$

$$\phi_{1_{reset}} = 3/4 \frac{E_2}{N_3} = \frac{3 E_2}{2 N_3 2} = \frac{3 E_2}{2 N_2} = 3/2 \phi_2$$

If the No. 2 core 27 receives a flux change of eight units, the flux in the No. 1 core 26 is reset by minus 12 units. Since the No. 1 core was already at plus six units, it is now saturated at minus $\phi$ maximum. When the $Q_1$ NPN transistor 11 comes on, the flux level of the No. 1 core 26 will be increased again by six units from minus $\phi$ maximum to 0 and the reset voltage on the $N_5$ winding 33 section of reset coil 35 will drive the No. 2 core 27 to a positive $\phi$ maximum. When the $Q_2$ NPN transistor 12 comes on again, the flux density $\phi_2$ in the No. 2 core 27 will be decreased by eight units from a positive $\phi_2$ maximum to minus 2 and the No. 1 core 26 will be driven back to $-\phi$ maximum. Thus, each core will operate from one end of its B–H loop to somewhere in the center. With the particular reset windings and voltages selected, the transformer can be made to operate with a maximum volt second unbalance of $3/2\ \phi$ minimum $- \phi$ minimum or one-half the minimum flux excursion. By choosing other reset voltages, and number of turns, the transformer can be made to operate with more or less unbalance as the case may be.

The two-core dc to dc converter power transformer embodiment of FIG. 3 includes portions duplicating portions of the FIG. 2 embodiment numbered the same and description of portions that are the same are not necessarily repeated again. In this embodiment primary coils 17 and 18 are indicated as being 19-turn coils and the secondary output coils 28' and 29' are indicated as being 28-turn coils. The phase polarity of secondary coils 28' and 29' are indicated by the dots as being opposite that with coils 28 and 29 in the embodiment of FIG. 2; however, within a single working unit as long as the phase polarity is consistent, the operational results should be effectively the same. In FIG. 3, the reset coils 32' and 35' and the interconnecting circuitry is somewhat different than with reset coils 32 and 35 and the interconnecting circuitry in FIG. 2 with reset coil 32' having a lower 16-turn section 41 and an upper 27-turn section 42 with the sections separated by tap 43. Reset coil 35' has, in like manner, a lower 16-turn coil section 44 and an upper 27-turn coil section 45 with the sections separated by tap 46. The upper end of reset coil 32' and of the coil section 42 is connected to a current limiter 36' and through the current limiter to the top of reset coil 35' and the coil section 45. In this instance, the current limiter 36' is in the form of a current limiting diode with the anode connected to coil section 42 and the cathode connected to coil section 45. The tap 46 of reset coil 35' is connected to the anode of diode 38' having a cathode connection to the bottom of section 41 of reset coil 32' and the bottom of section 44 of reset coil 35' is connected to the anode of diode 39' having a cathode connection to the tap 43 of reset coil 32'.

Referring also to FIG. 4, $Q_1$ base drive and $Q_2$ base drive to NPN transistors 12 and 11 from the signal source 15 are shown as being opposite phase square waves varying from plus 1 volt to minus 1 volt and the $Q_1$ and $Q_2$ collector voltage waveforms are voltages appearing in the collector to transformer primary coil connective lines. The reset voltage waveform shows a waveform ranging from just below 0 volts to as low as minus 40 volts with spikes even going to a lower negative voltage measured across reset coil 32' whereas the corresponding waveform measured across reset coil 35' would be a duplicate inverted waveform of the reset voltage waveform shown going to positive voltages instead of the negative voltages that are shown. The resulting $T_1$ and $T_2$ output waveforms ranging between a positive 28 volts and a negative 45 volts are the outputs developed from power transformer secondary coils 29' and 28' and delivered to load 22 as rectified by diodes 23 and 24. It is of interest to note that the voltage appearing on the collector to primary coil interconnects to coils 17 and 18 drop respectively from approximately positive 50 volts to the 20 volts supplied by dc supply 16 during each reset cycle for the respective core 26 or 27 as reset to minimum or maximum $\phi$ is attained as the case may be. These 20 volt waveform porches on the transistor collector to primary coil connective lines are coincident with the 40 volt level portions of the reset voltage, as varied by spikes due to non-ideal transformer parameters, and also coincident with zero voltage level portions of one or the other of the $T_1$ and $T_2$ output waveforms.

Whereas this invention is herein illustrated and described with respect to two embodiments hereof, it should be realized that various changes may be made without departing from essential contributions to the art made by the teachings hereof.

I claim:

1. In a dc to dc converter power transformer; two magnetic material cores; a first primary coil on one, and a second primary coil on the other of said two magnetic material cores; dc power supply means; switch means for alternatively applying dc to said first and second primary coils connected to said dc power supply means and to said first and second primary coils; a first secondary coil on one, and a second secondary coil on the other of said two magnetic material cores; signal rectifying output to load connective circuit means connected to said first and second secondary coils; a first reset coil on one, and a second reset coil on the other of said two magnetic material cores; and circuit interconnect means between said first reset coil and said second reset coil including rectifying means.

2. The dc to dc converter power transformer of claim 1, wherein said rectifying means is diode means.

3. The dc to dc converter of claim 2, wherein said first and second reset coils each include first and second opposite ends and a coil tap; with said circuit interconnect means including, a circuit interconnection between said first ends of said first and second reset coils, a connection through a first diode from the tap of said first reset coil to the second opposite end of said second reset coil, and a connection through a second diode from the second opposite end of said first reset coil to the tap of said second reset coil; and with common electrodes of said first and second diodes connected to said first reset coil.

4. The dc to dc converter of claim 3, wherein current limiting means is included in said circuit interconnection between said first ends of the reset coils.

5. The dc to dc converter of claim 4, wherein said current limiting means is a resistor.

6. The dc to dc converter of claim 4, wherein said current limiting means is a current limiting field effect diode.

7. The dc to dc converter of claim 4, wherein said taps of said first and second reset coils are center taps.

8. The dc to dc converter of claim 4, wherein said taps are off center taps in said first and second reset coils.

* * * * *